United States Patent [19]

Cole et al.

[11] 4,315,400

[45] Feb. 16, 1982

[54] METHOD OF AND APPARATUS FOR PREHEATING PRESSURIZED FLUIDIZED BED COMBUSTOR AND CLEAN-UP SUBSYSTEM OF A GAS TURBINE POWER PLANT

[75] Inventors: Rossa W. Cole, E. Rutherford; August H. Zoll, Cedar Grove, both of N.J.

[73] Assignee: Curtiss-Wright Corporation, Wood-Ridge, N.J.

[21] Appl. No.: 119,798

[22] Filed: Feb. 8, 1980

[51] Int. Cl.³ .............................. F02C 3/26; F02C 7/26
[52] U.S. Cl. .............................. 60/39.02; 60/39.14 R; 60/39.46 S
[58] Field of Search ............ 60/39.02, 39.14 R, 39.12, 60/39.46 S; 110/263; 122/4.6; 431/7, 170

[56] References Cited

U.S. PATENT DOCUMENTS

| | | | |
|---|---|---|---|
| 2,672,012 | 3/1954 | Vernon | 60/39.46 S |
| 2,958,298 | 11/1960 | Mayers | 60/39.46 S |
| 3,791,137 | 2/1974 | Jubb et al. | 60/39.46 S |
| 4,033,117 | 7/1977 | Smith et al. | 60/39.46 S |

Primary Examiner—Louis J. Casaregola
Attorney, Agent, or Firm—Arthur L. Frederick

[57] ABSTRACT

In a gas turbine power plant having a pressurized fluidized bed combustor, gas turbine-air compressor subsystem and a gas clean-up subsystem interconnected for fluid flow therethrough, a pipe communicating the outlet of the compressor of the gas turbine-air compressor subsystem with the interior of the pressurized fluidized bed combustor and the gas clean-up subsystem to provide for flow of compressed air, heated by the heat of compression, therethrough. The pressurized fluidized bed combustor and gas clean-up subsystem are vented to atmosphere so that the heated compressed air flows therethrough and loses heat to the interior of those components before passing to the atmosphere.

8 Claims, 1 Drawing Figure

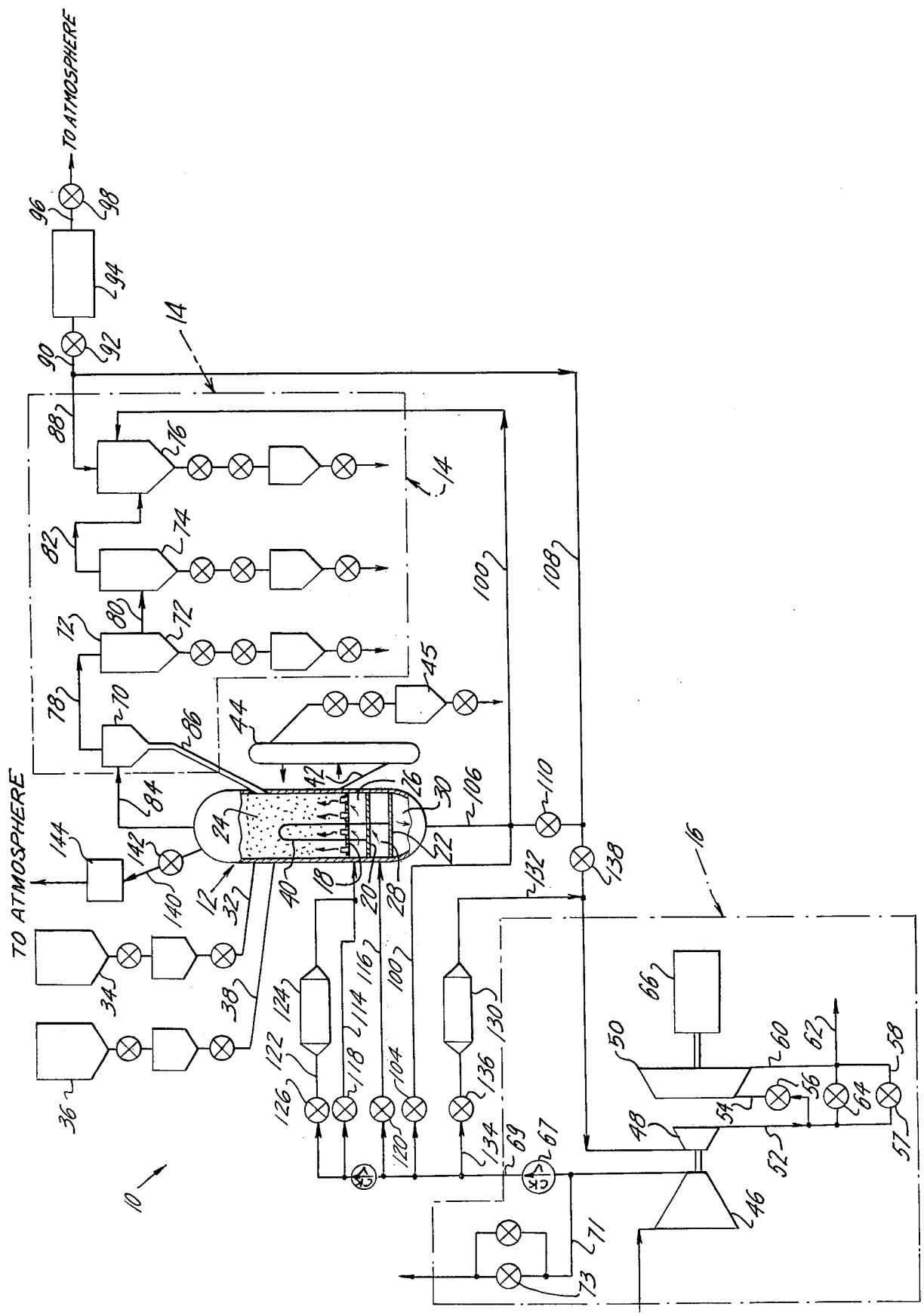

METHOD OF AND APPARATUS FOR PREHEATING PRESSURIZED FLUIDIZED BED COMBUSTOR AND CLEAN-UP SUBSYSTEM OF A GAS TURBINE POWER PLANT

The U.S. Government has rights in this invention pursuant to Contract No. EX76-C-01-1726 awarded by the U.S. Energy Research and Development Administration, now known as the Department of Energy.

The invention relates to gas turbine power plants having a pressurized fluidized bed combustor, a gas turbine-air compressor subsystem and a gas clean-up subsystem and, more particularly, to the method of and apparatus for preheating the pressurized fluidized bed combustor and the gas clean-up subsystem before cold start-up of the power plant.

In a gas turbine power plant of the aforesaid type which has a pressurized fluidized bed combustor, as exemplified in the U.S. Patents to Jubb et al U.S. Pat. No. 3,791,137 dated Feb. 12, 1974 and Harboe, U.S. Pat. No. 3,924,402 dated Dec. 9, 1975, and has a gas clean-up subsystem to remove from the combustion gases generated in the combustor entrained particulate solids before passage of the gases to the gas turbine, it is necessary to preheat the combustor prior to the initiation of cold start-up of the power plant. In absence of preheating of the combustor and the gas clean-up subsystem, the cool interior walls of the combustor and gas clean-up subsystem would condense the water generated by the combustion of hydrocarbons, from the combustion gases, which water, in mixing with the fly ash and other entrained particulates, such as calcium oxides, would form a paste-like material which hardens to a cement-like substance and fouls the combustor and gas clean-up subsystem, thereby adversely affecting their efficiency. It is desirable that any method or means for preheating the combustor and gas clean-up subsystem be thermally efficient since the size of the combustor and gas clean-up subsystem will necessitate prolonged exposure, as for example about twenty-four hours, to affect the heating of those components.

It is, therefore, an object of the present invention to provide a method and apparatus for preheating the pressurized fluidized bed combustor and gas clean-up subsystem of a gas turbine power plant having a gas turbine-air compressor subsystem, which preheating method and apparatus are relatively simple and thermally efficiently prevents condensation on the interior surfaces of the combustor and the gas clean-up subsystem.

Another object of this invention is to provide a method and apparatus for preheating the pressurized fluidized bed combustor and gas clean-up subsystem of a power plant before the cold start-up of the power plant, which eliminates the need for a source of heat separate from the combustor, gas clean-up subsystem and the gas turbine-air compressor subsystem of the power plant.

A further object of the present invention is to provide a method and apparatus for preheating the pressurized fluidized bed combustor and gas clean-up system of gas turbine power plant having a gas turbine-air compressor subsystem which preheating method and apparatus utilize compressed air heated by the heat of compression and is therefore relatively moisture-free.

A still further object of this invention is to provide a method and apparatus for preheating interior surfaces of a pressurized fluidized bed combustor and gas clean-up subsystem having a separator of the type requiring compressed air and connected to receive compressed air from the gas turbine-air compressor subsystem of a gas turbine power plant, which preheating method and apparatus provides for flow of compressed air through the gas clean-up system and combustor in a direction reverse to the flow of combustion gases through those elements.

SUMMARY OF THE INVENTION

Accordingly, the present invention contemplates a novel method and apparatus for preheating, prior to "cold start-up" of a gas turbine power plant, a pressurized fluidized bed combustor and gas clean-up subsystem of the power plant.

The gas turbine power plant is of the type which has the pressurized fluidized bed combustor, the gas clean-up subsystem and a gas turbine-air compressor subsystem interconnected to provide for the passage of combustion gases generated in the combustor to the gas clean-up subsystem wherein the particulate material entrained in the combustion gases is substantially removed so that substantially clean combustion gases are passed to the gas turbine of the gas turbine-air compressor subsystem for driving the gas turbine and, in turn, the air compressor. The compressed air is conducted to the pressurized fluidized bed for fluidizing and supporting combustion of solid fuel and to control the temperature of combustion.

The preheating apparatus comprises a combustion means, which is separate from the pressurized, fluidized bed combustor, for generating combustion gases. A first conduit means is connected to the combustion means and the gas turbine to conduct combustion gases to the latter to drive the gas turbine and, in turn, the air compressor. A second conduit means is provided for communicating the air compressor with the gas clean-up subsystem and the fluidized bed combustor to pass heated compressed air thereto. A valve means is disposed and operative to a position to prevent flow of gaseous fluid from the gas clean-up subsystem to the gas turbine. Vent means for venting the fluidized bed combustor and the gas clean-up subsystem is provided which vent means is selectively operative to communicate the interior of the pressurized fluidized bed combustor and gas clean-up subsystem with atmosphere to effect flow of heated compressed air through the gas clean-up subsystem and the combustor and, thence to atmosphere. During the flow of the compressed air, which is at about 350° F., it loses heat to the gas clean-up subsystem and combustor to thereby heat the interior surfaces of the pressurized fluidized bed combustor and gas clean-up subsystem. This preheating prevents the condensation of water vapor on those interior surfaces upon start-up of the power plant.

A narrower aspect of the present invention is where the gas clean-up subsystem comprises a plurality of serially connected together separators and the last one, relative to the direction of combustion gas flow when the power plant is in operation, is of the type which requires compressed air for optimum effectiveness, as for example, a Series SV Dust Collector manufactured by Aerodyne Development Corporation of 29085 Solon Road, Cleveland, Ohio, U.S. and the compressed air for preheating is conducted through the same conduit which supplies the last separator with compressed air during operation of the power plant. The vent means is associated with the combustor so that the compressed air flows, through the gas clean-up subsystem and the combustor, in a direction opposite the direction of combustion gas flow when the power plant is in operation.

The method of preheating the combustor and gas clean-up subsystem according to this invention comprises the steps of generating combustion gases in a combustor separate from the fluidized bed combustor and passing such combustion gases to the gas turbine to drive the latter and thereby the air compressor to produce compressed air heated by the heat of compression. Thereafter, the compressed air from the air compressor is conducted to the clean-up subsystem and fluidized bed combustor while the flow of gaseous fluid from the clean-up subsystem to the gas turbine is prevented. Also the interior of the fluidized bed combustor and gas clean-up subsystem is vented to atmosphere so that flow of compressed air is effected through the clean-up subsystem and the fluidized bed combustor.

In a narrower scope, the preheating method according to this invention comprises the step of conducting compressed air to the gas clean-up subsystem and venting first the combustor so that compressed air flow is through the gas clean-up subsystem and combustor in a direction opposite the combustion gas flow through those components when the plant is in operation.

BRIEF DESCRIPTION OF THE DRAWING

The invention will be more fully understood from the following description when considered in connection with the accompanying drawing in which a gas turbine power plant in accordance with this invention is shown.

DESCRIPTION OF THE PREFERRED EMBODIMENT

Now referring to the drawing, the reference number 10 generally designates the gas turbine power plant, according to this invention, which power plant comprises, in general, a fluidized bed combustor 12, clean-up subsystem 14 and a gas turbine and air compressor subsystem 16, the subsystems 14 and 16 being encompassed by dot-dash lines on the drawing.

The fluidized bed combustor 12 is provided with three transversely extending partitions 18, 20 and 22 which divide the interior of the fluidized bed combustor into a reaction or combustion zone 24, two inlet plenums 26 and 28 and an outlet plenum 30. The fluidized bed combustor 12 is connected, via conduit 32, to a fuel supply means 34 to receive appropriately sized particulate fuel, as for example high sulphur coal, in combustion zone 24. Also, the fluidized bed combustor 12 is connected to supply means 36, via conduit 38, to receive in the combustion zone 24 a sulphur dioxide absorbing material, as for example crushed dolomite. The partition 18 may be perforated or be provided with tuyeres to distribute compressed air from plenum 26 into combustion zone 24. To control the reaction temperature in combustion zone 24 within the range of about 507° C. and 954° C., a heat exchanger 40 is disposed in combustion zone 24 and is connected to receive compressed air from inlet plenum 28 and to discharge heated air into outlet plenum 30. Ash produced in combustion zone 24 is removed therefrom through a discharge conduit 42, an ash cooler 44 and an ash hopper 45.

The gas turbine and air compressor subsystem 16 comprises an air compressor 46 coupled to a gas turbine 48 to be driven by the latter. The gas turbine 48 is connected to exhaust combustion gases to a free power turbine by way of conduits 52 and 54. An isolation valve 56 is disposed in conduit 54 to control flow of exhaust gases from turbine 48 into power turbine 50. Also a valve controlled bypass conduit 58 is provided to pass exhaust gas from turbine 48 to the discharge conduit 60 of power turbine 50. A conduit 62 is provided to conduct exhaust gas from exhaust conduit 60 of free turbine 50 to a waste heat boiler (not shown) or from exhaust conduit 52 of gas turbine 48. A valve 64 is provided in conduit 62 to permit, when open and when a valve 57 in bypass conduit 58 and valve 56 are closed, exhaust gas from gas turbine 48 to bypass free power turbine 50 and to be conducted directly to the waste heat boiler. The free power turbine 50 is connected to drive a load such as an alternator 66. To prevent surging of compressor 46, a surge prevention means is provided in the form of a check valve 67 in a main compressed air supply pipe 69 and bypass pipe 71 and valve 73.

The clean-up subsystem 14 is provided in plant 10, which system comprises a plurality of separators 70, 72, 74 and 76 which are serially connected together by conduits 78, 80 and 82 to sequentially receive combustion gases discharged from fluidized bed combustor 12 through an outlet conduit 84. Separator 70 is connected, through a discharge conduit 86, to fluidized bed combustor 12 so that unburned particles of fuel entrained in the combustion gases and separated therefrom in separator 70 are returned to the combustion zone 18 for burning. The substantially clean combustion gases are discharged from separator 76 by an outlet conduit 88. The outlet conduit 88 is also connected to a first vent means comprising a pipe 90, which has a valve 92, and is connected to a pressurized water scrubber 94, the water scrubber 94 being vented through a pipe 96 when a valve 98 therein is in an open position. Valve 92 is closed except during start-up or shutdown operation of the power plant 10. Separator 76 may be of a type which requires compressed air, as for example the Series SV Dust Collector manufactured by the Aerodyne Development Corporation located at 29085 Solon Road, Cleveland, Ohio, U.S. To supply the compressed air for separator 76, separator 76 is connected to fluidized bed combustor 12 by a pipe 100 which communicates, at one end, with main compressed air supply pipe 69 and, at the other end, communicates with separator 76. In operation of power plant 10, some of the total compressed air is delivered directly to separator 76, through pipe 100. The pipe 100 is provided with a valve 104 for controlling air flow therethrough from air compressor 46. A pipe 106 is provided to connect plenum 30 of fluidized bed combustor with pipe 100 and a clean combustion gas pipe 108 which connects the outlet pipe 88 of separator 76 with gas turbine 48 to pass cleaned, high temperature combustion gas to the latter. A valve 110 is disposed in pipe 106 between its connections with pipes 100 and 108. By modulation of valve 110, the amount of compressed air flow through pipe 100 is regulated in accordance with the demand of separator 76, which valve adjustment determines the amount of air bypassed through pipe 106 to pipe 108.

In addition to main compressed air supply pipe 69, there are provided branch pipes 114 and 116 to pass compressed air, when the power plant is in operation, to pressurized fluidized bed combustor 12. The branch pipe 114 is connected at one end to main supply pipe 69 and, at the opposite end, to plenum 26 to conduct compressed air to the latter. The branch pipe 116 is connected, at one end, to main supply pipe 69 and, at the opposite end, to plenum 28. Flow of compressed air, through branch pipes 114 and 116, is regulated by valves 118 and 120 in the respective pipes. The valves 118 and 120 are normally adjusted to provide a distribution of the compressed air discharged by compressor 46 into main supply pipe 69 so that about one-third ($\frac{1}{3}$) is conducted to plenum 26 for suspension of the fuel particles and for support of combustion of the fuel, while about two-thirds ($\frac{2}{3}$) of the air is delivered to plenum 28 for flow through heat exchanger 40 and cooling of the combustion zone 24.

A bypass pipe 122 is connected at one end to main supply pipe 69 to receive, from the latter, compressed air and to pass the compressed air to an auxiliary combustor 124. Fuel, such as oil or gas, is selectively injected into combustor 124 to provide hot gases to pipe 114 and, thence to plenum 26 of fluidized bed combustor 12, when it is necessary to heat the compressed air, as in the start-up mode of operation. A valve 126 is provided in bypass pipe 122 to control flow of compressed air to second auxiliary combustor 124.

In accordance with this invention, prior to cold start-up of power plant 10, fluidized bed combustor 12 and gas clean-up subsystem 14 of power plant 10, are preheated to prevent the detrimental effects of condensation on the interior surfaces of the fluidized bed combustor 12 and separators 70, 74 and 76 of gas clean-up subsystem 14. This preheating is accomplished by providing a second auxiliary combustor 130 which may form part of or be separate from gas turbine-air compressor subsystem 16. Oil or a gaseous fuel is burned in combustor 130 to produce combustion gases which are passed to gas turbine 48, via an outlet pipe 132 of combustor 130 and pipe 108, to drive the gas turbine and, in turn, compressor 46. Initially compressed air may be supplied to combustor 130 from an auxiliary source of compressed air (not shown) until compressor 46 is driven sufficiently fast to supply the required compressed air for combustion in combustor 130, via pipe 69 and pipe 134. A valve 136 in pipe 134 is provided to control compressed air flow to combustor 130. For preheating, valves 92, 110, 118, 120 and 126 are closed along with a valve 138 which is disposed in pipe 108 between the connections of pipes 106 and 132 with pipe 108. The valve 104 in pipe 100 is in an open position to permit flow of compressed air, heated by the heat of compression to a temperature of about 350° F. The pressurized fluidized bed combustor 12 is provided with a vent means which, as shown, may be a conduit 140, the flow through which is controlled by a valve 142. This conduit 140 communicates at one end with the interior of pressurized fluidized bed combustor 12 and to atmosphere via a filter 144. This filter may be the baghouse (not shown) of the power plant or be a separate filtering member to remove, before discharge of the compressed air to atmosphere, any entrained particles in the compressed air. Alternatively, the vent means may be a manhole (not shown) in combustor 12 so as to communicate with reaction chamber 24 and having a removable cover (not shown). A filter element (not shown) may be inserted in the manhole after removal of the cover to filter the compressed air passing to atmosphere. With vent valve 142 open, compressed air flows through pipe 100 into separator 76 and thence through separators 74, 72 and 70 via the interconnecting pipes 82, 80 and 78 in a direction reverse to that of the flow of combustion gases generated in fluidized bed combustor 12 during operation of power plant 10. From separator 70, the compressed air flows into fluidized bed combustor 12, via pipe 84 and 86, and thence out of fluidized bed combustor 12, through conduit 140 and filter 144, to atmosphere. The flow of compressed air continues until the interior surfaces of fluidized bed combustor 12 and gas clean-up subsystem 14 are heated sufficiently to avoid condensation thereon when the start-up of the power plant it initiated.

It is to be understood that while the flow of compressed air for preheating is shown flowing through a pipe 100 to a separator 76 which requires in its normal operation compressed air, compressed air for preheating may be supplied to a separator 76 which does not normally receive compressed air and pipe 100 could be provided to supply such compressed air solely for preheating purposes without departing from the scope and spirit of this invention. Furthermore, if separator 76 is not of the type requiring compressed air for its normal operation, pipe 100 and vent means in the form of vent conduit 140 can be omitted and preheating with compressed air can be accomplished by opening valves 92 and 98 to communicate gas clean-up subsystem to atmosphere and by opening valve 118 so that compressed air flows into plenum 26 of fluidized bed combustor 12 via pipe 69 and branch pipe 114. The other valves 110, 120, 126 and 138 are, in this embodiment, in a closed position. From plenum 26, the compressed air would then flow through gas clean-up subsystem 12 in the same direction as combustion gas flows when the power plant is in operation. Thereafter, the compressed air would flow from gas clean-up subsystem 14 to atmosphere via pipe 90, scrubber 94 and pipe 96.

It is believed now readily apparent that the present invention provides a novel apparatus and method of preheating a pressurized fluidized bed combustor and a gas clean-up subsystem of a power plant, which preheating apparatus and method is thermodynamically efficient and is simple and inexpensive in construction.

Although but two embodiments of the invention have been illustrated and described in detail, it is to be understood that the invention is not limited thereto. Various changes can be made in the arrangement of component parts without departing from the spirit and scope of the invention as the same will be now understood by those skilled in the art.

What is claimed is:

1. In a gas turbine power plant having a pressurized fluidized bed combustor, a gas clean-up subsystem and a gas turbine-air compressor subsystem which are interconnected to provide for the generation of combustion gases in the combustor and flow of such gases through the gas clean-up subsystem and cleaned combustion gases from said gas clean-up subsystem to the gas turbine for driving the latter and said air compressor, the air compressor being connected to pass compressed air to the combustor, a preheating apparatus for heating the combustor and gas clean-up subsystem prior to start-up of the power plant comprising:

(a) combustion means separate from said combustor for providing combustion gases, (b) first conduit means for connecting the combustion means with the gas turbine of said gas turbine-air compressor subsystem to conduct combustion gases to the gas turbine to drive the latter and thereby said air compressor, (c) second conduit means for communicating the air compressor with the gas clean-up subsystem and said combustor to pass heated compressed air thereto, (d) valve means disposed in said second conduit means and operative to a position to prevent flow of fluid from the gas clean-up subsystem to the gas turbine, and (e) vent means for the interior of said combustor and gas clean-up subsystem and selectively operative to communicate the interior of the combustor and gas clean-up subsystem with the atmosphere to effect flow of heated compressed air through the gas clean-up subsystem and combustor to thereby heat the gas clean-up subsystem and the combustor.

2. The apparatus of claim 1 wherein said vent means coacts with the combustor and the second conduit means communicates the air compressor first with the gas clean-up subsystem so that heated compressed air from said air compressor flows through the gas clean-up subsystem and thence into the combustor in a direction opposite to the direction of the combustion gas flow when the power plant is in operation.

3. The apparatus of claim 2 wherein said vent means is an opening in the wall of the combustor closed by a removable cover which is removed for preheating.

4. The apparatus of claim 1 wherein said gas clean-up subsystem comprises a plurality of separators serially connected together and to the combustor to sequentially receive combustion gases from the latter under normal operation of the power plant, and wherein said second conduit means is connected to the last separator with respect to combustion gas flow when the power plant is in operation.

5. The apparatus of claim 4 wherein said last separator is of the cyclone type employing compressed air and wherein said second conduit means conducts compressed air to said last separator under normal operating conditions of the power plant.

6. In a gas turbine power plant having a gas turbine air compressor subsystem, a pressurized fluidized bed combustor and clean-up subsystem connected to the fluidized bed combustor to receive combustion gases from the latter and to remove entrained particulate material from such combustion gases and also connected to the gas turbine-air compressor subsystem to pass clean combustion gases to the turbine of the gas turbine-air compressor subsystem to drive the gas turbine and, in turn, drive the air compressor of such subsystem, the gas turbine-air compressor subsystem being connected to the fluidized bed combustor to deliver compressed air to the latter, the method of preheating prior to start-up the combustor and clean-up subsystem comprising the steps of:

(a) generating combustion gases in a combustor separate from said fluidized bed combustor and passing such combustion gases to the gas turbine to drive the latter and thereby drive the air compressor;

(b) passing the compressed air heated by the heat of compression to the clean-up subsystem and fluidized bed combustor;

(c) preventing flow of gaseous fluid from the clean-up subsystem to the gas turbine; and (d) venting the interior of the fluidized bed combustor and clean-up subsystem to effect flow of the heated compressed air through the clean-up subsystem and the fluidized bed combustor.

7. In the method of claim 6 wherein said clean-up system has a plurality of serially connected together separators, the step of passing the heated compressed air to the last separator of said plurality of separators relative to combustion gas flow through the clean-up subsystem when the plant is in operation.

8. In the method of claim 6 the step of filtering the compressed air venting from said combustor and gas clean-up subsystem to remove entrained particulates from the compressed air before discharge to atmosphere.

* * * * *